Figure 1:
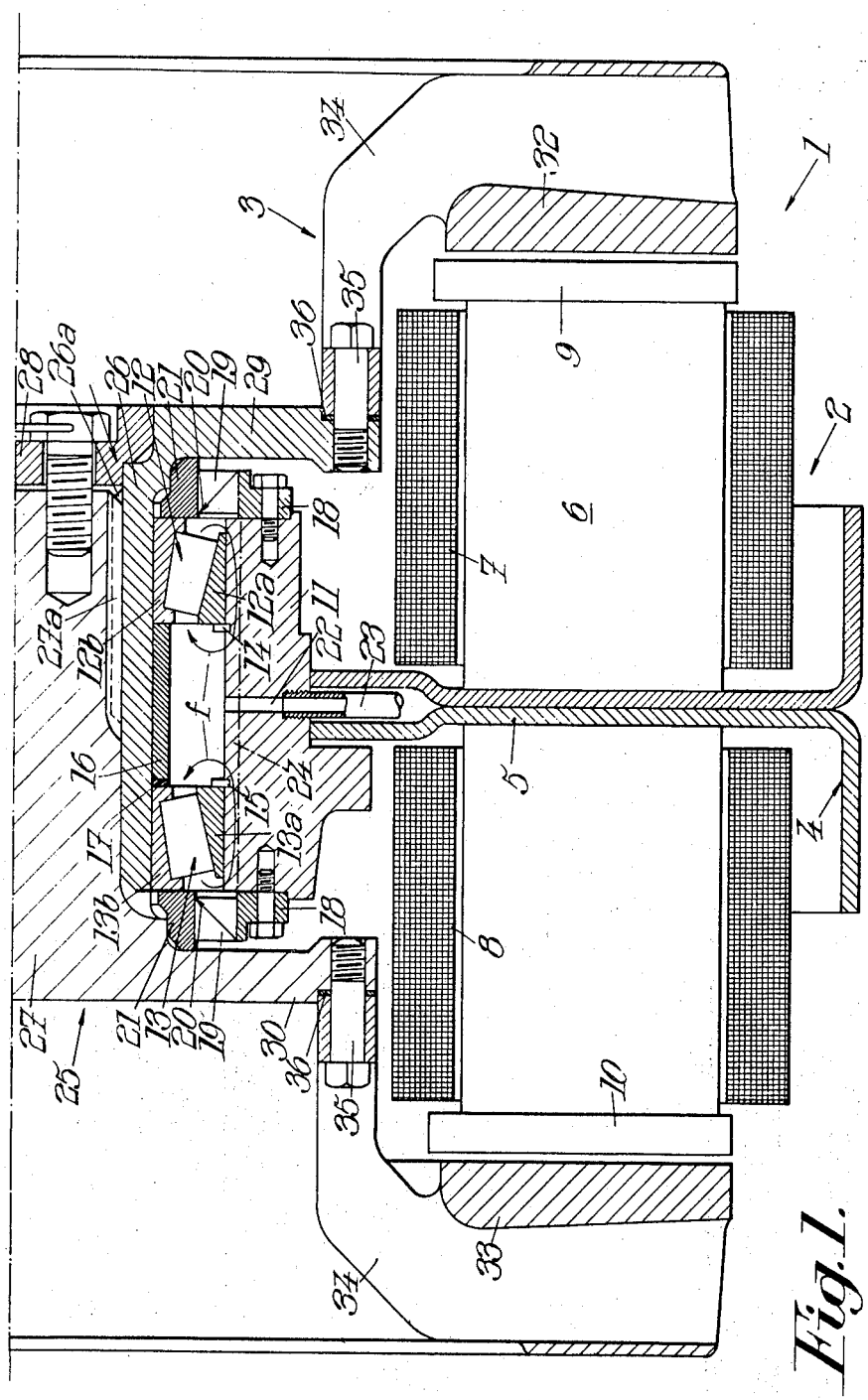

United States Patent [19]
Bessière

[11] 3,821,572
[45] June 28, 1974

[54] EDDY CURRENT BRAKES

[75] Inventor: Pierre Etienne Bessière, St. Nom-La-Breteche, France

[73] Assignee: Societe Labavia-S.G.E., Paris, France

[22] Filed: July 3, 1972

[21] Appl. No.: 268,796

[30] Foreign Application Priority Data
July 8, 1971 France .............................. 71.25099

[52] U.S. Cl. .................................. 310/93, 310/268
[51] Int. Cl. ............................................ H02k 49/12
[58] Field of Search ................. 310/76, 92, 93, 268

[56] References Cited
UNITED STATES PATENTS
2,830,206  4/1958  Bessiere ................................ 310/93
3,391,292  7/1968  Elizade ................................. 310/93
3,553,507  1/1971  Bessiere ........................... 310/268 X Primary Examiner—J. D. Miller
Assistant Examiner—Robert J. Hickey
Attorney, Agent, or Firm—Stevens, Davis, Miller & Mosher

[57] ABSTRACT

Independently mounted eddy current brake comprising an annular inductor stator bearing in its central portion, two coaxial bearings and a rotor having a central hub, borne by these two bearings. The hub is coupled in rotation to a shaft to be braked and connected to two armatures of revolution framing the inductor. The hub is constituted by a grooved sleeve and by a splined stub, adapted to coact together. The sleeve and the stub are coupled respectively to the armatures through transverse plates each assembled directly to a respective element of the shaft to be braked. The device is useful for vehicle brakes.

7 Claims, 2 Drawing Figures

EDDY CURRENT BRAKES

This invention relates to an independently mounted eddy current brake. More particularly it relates to such eddy current brakes which comprise an annular inductor stator bearing in its central portion two coaxial bearings and a rotor having a central hub, borne by these two bearings, connected in a rotation to the shaft to be braked and coupled, especially by two crowns of bent fins, to two armatures of revolution straddling the inductor.

It is a particular object of the invention to improve such a brake so that it responds to the various exigencies of practice better than hitherto and especially so that it can withstand severe operating conditions, especially high rotary speeds and high torque to be transmitted, whilst having a reduced axial bulk at the level of the transmission shaft on which this brake is mounted.

According to the invention, a brake of the type described, is characterized by the fact that, on one hand, the hub borne by the bearings is constituted by an internally grooved sleeve and an externally grooved tip or stub adapted to coact together and that said sleeve and said stub are coupled respectively to the armatures (or eddy current members) by transverse plates each assembled directly to one element of the shaft to be braked, situated on the side of this plate. The two plates axially straddle, at a short distance, the bearings and their fluid-tight seals.

Preferably, the bearings used are conical roller bearings.

The invention consists, apart from the features mentioned above, of certain other features which are preferably used at same time and which will be more explicitly considered below, with regard to preferred embodiments of the invention which will now be described in a more detailed manner, with reference to the accompanying drawings, but which are given of course purely by way of illustration and in no limiting sense.

FIG. 1 of these drawings is an axial section of the inner portion of one embodiment of a brake constructed according to the invention.

Figure 2:
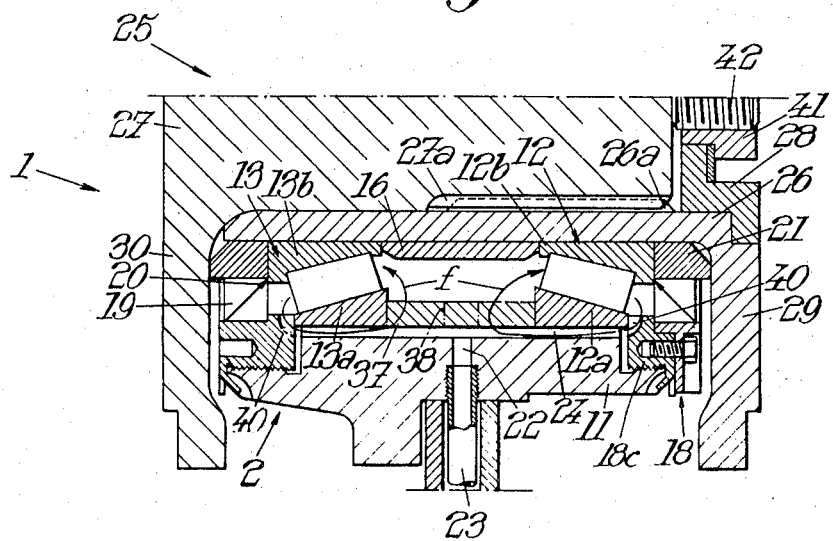

FIG. 2 shows similarly to FIG. 1, a modification of the embodiment of the brake of FIG. 1, in which the windings of the stator have not been shown.

Referring to FIG. 1, it is seen that the brake 1 comprises an inductor stator 2 and an eddy current member armature 3.

The stator 2 comprises, in known manner, a support 4 designed to be fixed, for example, to the chassis of the vehicle on which the brake must be mounted. This support forms a crown 5 in which are fixed the electromagnet cores 6. These cores 6 bear, on each side of the crown 5, two groups of coils 7 and 8 whose axes are distributed regularly over a circumference the plane of which is at right angles to the axis of the brake. The cores 6 are provided, at their ends, with polar expansions 9 and 10, so that on each side of the support 4, two crowns of electromagnets are formed. In each crown, neighbouring electromagnets have opposite polarities.

The support 4 comprises, in its central portion, sleeve 11 bearing, in an inner bore, two coaxial bearings 12 and 13, of which one at least is arranged to support axial thrusts. Preferably, these two bearings are of the conical roller type.

The two bearings are spaced axially from one another so as to ensure better centering and better support for the rotor 3. The inclinations of the axes of the rollers are opposite and are such that said axes approach the axis of rotation of the rotor in going from the outside to the inside of the sleeve 11.

The outer rings 12a, 13a of the bearings 12 and 13 are in abutment towards the inside of the sleeve 11 against open elastic rings 14, 15, anchored in grooves provided on the inner surface of the sleeve 11.

The inner rings 12b, 13b of the bearings 12 and 13 are kept spaced from one another by a cylindrical cross-bar 16 and a shim 17 enabling the axial distance separating said rings 12b, 13b to be adjusted.

At the two longitudinal ends of the sleeve 11, are fixed seal-holding rings 18 equipped with seals 19 having lips 20, shown diagramatically by an arrow, which rub against the outer surface of a ring 21 driven by the rotor.

The diameter of the outer surface of the ring 21 and of the inner edge of the lips 20 of the seal 19 is less than the outer diameter of the rings 12a, 13a.

A vertical channel 22, is provided at the base of sleeve 11 to enable introduction of grease into this sleeve to lubricate the bearings 12 and 13. The end of this channel opening towards the outside is threaded and coupled to a vertical tube 23 for the introduction of grease. The vertical channel (not shown) diametrically opposite to the channel 22 is provided at the upper portion of sleeve 11 to enable the removal of excess grease to the outside.

On the inner surface of the sleeve 11, at the upper portion of said surface, longitudinal grooves 24 (shown by mixed broken lines in FIG. 1) opening into the bore of the sleeve 11 and extending above the outer rings 12a, 13a, are provided. During the operation of the brake, these grooves allow a flow of grease to be established from the inside to the outside of the bearings along the path indicated by the arrows $f$ in FIG. 1, as a result of the centrifugal projection effect of said grease due to the bearings.

The rotor 3 comprises a hub 25 engaged in inner rings 12b, 13b of the bearings 12 and 13, and borne by the latter.

The hub 25 is constituted by a grooved sleeve 26 and by a grooved stub 27 of which the respective grooves 26a and 27a are complementary.

These grooves can extend over a sufficiently large distance since the whole axial length situated between the outer surfaces of the bearings 12 and 13 is available for the housing of these grooves. In FIG. 1, said grooves extend over a distance greater than half that which separates the outer surfaces of the bearings 12 and 13.

Axially, the sleeve and the stub 26 and 27 are connected to one another, through a cap 28 arranged in unilateral abutment against the sleeve 26, and held by bolting, on the stub 27; said cap 28 has a tendency to push the sleeve 26 against the stub 27.

The abovesaid sleeve 26 and stub 27 are coupled respectively to the armatures 32, 33 of rotor 3 by transverse plates 29 and 30, the middle plane of which is at right angles to the axis of the rotor. The transverse plates 29 and 30 are adapted to be assembled directly to the elements of the shaft to be braked situated on each side of these plates.

The two plates 29 and 30 frame, axially, at a short distance, the bearings 12 and 13 and their fluid-tight seals.

The rings 21 are borne respectively by the sleeve 26 and the stub 27, at the level of the coupling with the plates 29 and 30. On bolting the plug 28 onto the portion of the shaft 27, the rings 21, the inner rings 12b and 13b of the bearings 12 and 13, the shim 17 and the cross bar 16 are compressed between the inner surfaces of the plates 29 and 30.

The armatures 32, 33 are constituted by two magnetic elements of revolution, framing the cores 6, in the neighbourhood of their polar expansions 9 and 10. The space comprised between the latter and the magnetic element 32, 33, constitutes the air gap of the electromagnets.

The magnetic elements 32, 33 are borne by two crowns of bent fins 34 coupled, axially, in removable manner, to the periphery of the plates 29 and 30. Preferably, the wings 34 are fixed by bolts 35 on said plates, with the interposition of adjusting shims 36, of the air gap.

It will be noted that the engine torque which must be transmitted to the wheels of the vehicle passes (assuming that the transmission of this torque occurs from left to right in FIG. 1) through the plate 30, the stub 27, the grooves 27a, 26a, the sleeve 26, the plate 29, and finally, the transmission shaft element connected to said plate 29. This torque can reach high values of the order of $15 \times 10^3$ newton-meters (or $15 \times 10^{10}$ dyne-cm.) when the vehicle is in first gear. In the assembly according to the invention, a single set of complementary grooves 26a, 27a can be used of sufficient length to transmit the torque, with minimum axial bulk between the plates 29, 30.

Due to the fact that the diameter of the surface of the rings 21 on which the seal 20 rubs is less than the outer diameter of the outer rings 12a, 13a, if a leak occurs between lip 20 of the seal and ring 21, it will be seen from the drawing that a sufficient amount of lubricant will remain in the space between the bore of the sleeve 11 and the sleeve 26, the maximum level of this lubricant being determined by the level at which the contact between the lip 20 and the ring 21 is established.

Referring to FIG. 2, there can be seen in partial axial section, another modification of an embodiment of a braking device according to the invention, arranged so that the lubrication of the bearings is improved.

The parts of this braking device which are identical or play similar roles to parts already described in FIG. 1 are denoted by the same reference numerals and are not described again.

The outer rings 12a, 13a, of the bearings, are held axially spaced from one another by a ring 37, the thickness is less than the radial dimension of the surfaces of the rings 12a, 13a, turned towards the inside of the sleeve 11, and of which the outer diameter is equal to the inner diameter of said sleeve. This ring is closed so that its cylindrical outer surface is continuous.

However, an orifice provided at the highest portion of said ring passes through the wall of the latter, the axis of this orifice being at right angles to said wall as shown in mixed broken lines in FIG. 2. This orifice is aligned with the upward grease escape channel which is diametrically opposite the vertical channel 22 through which the grease enters.

At the upper portion of the sleeve 11, longitudinal grooves 24 and similar to those in FIG. 1, are provided to permit the establishment of a flow of lubricant shown by the arrows f.

As in FIG. 1, the grooves 24 are provided essentially at the upper portion of the sleeve 11, since the bearings 12 and 13 are subject to vertical forces, so that the lower portions of the rings 12a, 13a, are applied more forcefully against the inner surface of the sleeve 11 than the upper portions of said rings. The presence of several grooves 24 under the lower portions of the rings 12a, 13a, could be prejudicial to the life span of said rings or of the sleeve 11 due to vibration or oscillation to which said rings can be subjected when the vehicle on which the brake is mounted is being driven.

There is also provided a groove 24, passing in line with the inlet channel 22 for the grease, and enabling the latter to flow towards the ends of the sleeve 11.

The seal bearer ring 18, situated between the bearing 12 and the plate 29, comprises a crown 18c screwed to the end of sleeve 1.

This crown comprises cut-outs 40, for example four in number, distributed regularly over the circumference, and designed to form a communication, for the grease, between the space defined between the outer surfaces of the rings 12a, 13a and the ring 37, and the inner surface of the sleeve 11 on the one hand, and the spaces defined, axially, between the bearings 12 and 13 and their fluid-tight seal 19 on the other.

The axial coupling of the sleeve 26 and the stub 27, by means of the plug 28, is obtained, in a modification with respect to FIG. 1, by screwing a nut 41 on a threaded extension 42 of the portion of the shaft 27, said extension 42 passing through the plug 28.

The renewal of lubrication of the bearings 12 and 13 is effected in the following manner.

The new grease is introduced under pressure through the channel 22. By reason of the obstacle constituted by the wall of the ring 37, the grease must flow to the end of the sleeve 11, under the ring 37, and under the rings 12a, 13a. The grease passes through the cut-outs 40 and arrives in the spaces comprised between the bearings 12 and 13 and the fluid-tight seals 19. Hitherto, in conventional assemblies used for braking devices, these spaces were practically inaccessible to the new grease so that there persisted, permanently, in the brake, used grease and, possibly, debris of materials whose presence reduced the life span of the conical bearings.

With the device of FIG. 2, all the used grease is driven out by the arrival of the new grease.

The hub of the rotor, according to the invention, comprising the splined stub 27 and the grooved sleeve 26 is especially advantageous for operators whose axial bulk is small; in particular, it seems advantageous to adopt for a brake having a flat inductor stator such as the inductor stator with the permanent magnets described in the French Pat. No. 7,100,554 filed Jan. 8, 1971, by applicant, for: "Improvements in eddy current brakes with permanent magnet energization." The linking arms between the transverse plates and the armature elements could then be not bent axially, but have a generally rectilinear shape in a projection on an axial plane.

As a result of which, whatever the embodiment adopted, there is provided a braking device, whose bulk at the level of the shaft to be braked, that is to say in the neighbourhood of the axis of the brake, is reduced. This brake is suitable for withstanding severe operating conditions, since the reduction of the axial bulk by overlapping of the grooves of a sleeve and of a stub maintains intact the characteristics of good mechanical firmness of the assembly.

As is self-evident and as emerges already from the foregoing, the invention is in no way limited to those of its types of application, nor to those embodiments of its various parts, which have been more especially indicated; it emcompasses, on the contrary, all modifications, especialy those in which conical roller bearings would be replaced by ball bearings with oblique contacts, associated possibly with bearings with end abutment.

I claim:

1. An eddy-current brake for a shaft which rotates relative to a frame, comprising:
   an annular inductor stator fixed to said frame;
   two coaxial bearings mounted on said stator at the central portion thereof, said stator defining an outer bearing race;
   means forming a substantially fluid-tight seal around said bearings;
   a rotor connected to said shaft for rotation therewith, said rotor comprising
   a central hub portion disposed on said bearings and consisting of an internally splined sleeve mounted on said bearings and defining an inner bearing race and an externally splined stub, said stub being engaged with said sleeve over substantially their whole lengths, and
   a pair of transverse plate portions solid with said sleeve and said stub, respectively, said plates axially straddling said seal-forming means; and
   a pair of armatures coupled to said pair of transverse plates for rotation therewith, said armatures straddling said stator.

2. Brake according to claim 1, wherein the armatures include connecting members removably mounted on the periphery of the transverse plates.

3. Brake according to claim 2, further comprising spacers arranged between the connecting members and the transverse plates to permit adjustment of the air gap between the inductor and the armatures.

4. Brake according to claim 1, wherein said bearings include outer bearing rings, and wherein the inner edge of the fluid-tight seal associated with each bearing has a diameter less than the outer diameter of the outer rings of the bearings.

5. Brake according to claim 1, wherein the central portion of the stator comprises a bore in which the bearings are arranged, and wherein there are provided, longitudinal grooves adapted to extend above the bearings and to establish a flow of a lubricant from the axial ends of said central portion to the middle zone thereof on the operation of the brake.

6. A brake according to claim 1, wherein said bearings include outer rings spaced axially from one another by a further ring having a wall adapted to direct a lubricant towards the axial ends of the central portion of said stator and wherein said stator includes a channel having its axis disposed substantially at right angles to said lubricant directing wall of said further ring, said ring further including an orifice axially aligned with said channel.

7. An eddy-current brake for a shaft which rotates relative to a frame, comprising:
   an annular inductor stator fixed to said frame;
   two coaxial bearings mounted on said stator at the central portion thereof, said stator defining an outer bearing race;
   means forming a substantially fluid-tight seal around said bearings;
   a rotor connected to said shaft for rotation therewith, said rotor comprising
   a central hub portion disposed on said bearings and consisting of an internally splined sleeve mounted on said bearings and defining an inner bearing race and an externally splined stub, said stub being engaged with said sleeve over substantially their whole lengths, and
   a pair of transverse plate portions axially straddling said seal-forming means, wherein said sleeve and corresponding transverse plate portion constitute two integral parts of a first unitary member and said stub and corresponding transverse plate portion constitute two integral parts of a second unitary member; and
   a pair of armatures coupled to said pair of transverse plates for rotation therewith, said armatures straddling said stator.

* * * * *